(12) United States Patent
Lou (10) Patent No.: US 8,140,331 B2
(45) Date of Patent: Mar. 20, 2012

(54) FEATURE EXTRACTION FOR IDENTIFICATION AND CLASSIFICATION OF AUDIO SIGNALS

(75) Inventor: Xia Lou, Thousand Oaks, CA (US)

(73) Assignee: Xia Lou, Thousand Oaks, CA (US)

( * ) Notice: Subject to any disclaimer, the term of this patent is extended or adjusted under 35 U.S.C. 154(b) by 786 days.

(21) Appl. No.: 12/168,103

(22) Filed: Jul. 4, 2008

(65) Prior Publication Data

US 2009/0012638 A1 Jan. 8, 2009

Related U.S. Application Data

(60) Provisional application No. 60/958,478, filed on Jul. 6, 2007.

(51) Int. Cl.
*G10L 15/06* (2006.01)

(52) U.S. Cl. ........ 704/243; 704/205; 704/206; 704/500; 704/244; 704/245

(58) Field of Classification Search ................... 704/205, 704/206, 230, 231, 243, 246, 251, 500
See application file for complete search history.

(56) References Cited

U.S. PATENT DOCUMENTS

| | | | | |
|---|---|---|---|---|
| 5,185,800 A * | 2/1993 | Mahieux | ...................... | 704/500 |
| 5,369,726 A * | 11/1994 | Kroeker et al. | ............... | 704/236 |
| 5,715,372 A * | 2/1998 | Meyers et al. | ................... | 706/16 |
| 5,918,223 A | 6/1999 | Blum et al. | | |
| 6,016,473 A * | 1/2000 | Dolby | ........................... | 704/500 |
| 6,804,643 B1 * | 10/2004 | Kiss | .............................. | 704/234 |
| 6,931,351 B2 * | 8/2005 | Verma et al. | .................. | 702/182 |
| 6,963,975 B1 | 11/2005 | Weare | | |
| 6,990,453 B2 * | 1/2006 | Wang et al. | .................... | 704/270 |
| 7,031,980 B2 * | 4/2006 | Logan et al. | .......................... | 1/1 |
| 7,080,253 B2 * | 7/2006 | Weare | ........................... | 713/176 |
| 7,240,207 B2 | 7/2007 | Weare | | |
| 7,245,767 B2 | 7/2007 | Moreno et al. | | |
| 7,277,766 B1 * | 10/2007 | Khan et al. | ....................... | 700/94 |
| 7,440,891 B1 * | 10/2008 | Shozakai et al. | .............. | 704/233 |
| 7,460,994 B2 * | 12/2008 | Herre et al. | ..................... | 704/231 |
| 7,480,614 B2 * | 1/2009 | Huang | .......................... | 704/233 |
| 7,516,074 B2 * | 4/2009 | Bilobrov | .......................... | 704/270 |
| 7,565,104 B1 * | 7/2009 | Brown et al. | ................. | 455/3.01 |
| 7,567,899 B2 * | 7/2009 | Bogdanov | ...................... | 704/231 |
| 7,627,477 B2 * | 12/2009 | Wang et al. | .................... | 704/273 |
| 7,664,642 B2 * | 2/2010 | Espy-Wilson et al. | ......... | 704/254 |
| 7,881,931 B2 * | 2/2011 | Wells et al. | ..................... | 704/243 |
| 7,996,213 B2 * | 8/2011 | Tohyama et al. | ............. | 704/206 |
| 8,041,058 B2 * | 10/2011 | Kentish et al. | ................. | 381/119 |
| 2001/0044719 A1 * | 11/2001 | Casey | ............................ | 704/245 |
| 2003/0135513 A1 | 7/2003 | Quinn et al. | | |
| 2003/0191764 A1 * | 10/2003 | Richards | ........................ | 707/100 |

(Continued)

OTHER PUBLICATIONS

S. F. Boll, "Suppression of acoustic noise in speech using spectral subtraction," IEEE Transactions Acoustics Speech Signal Processing, vol. 27, No. 2, pp. 113-120, 1979.*

(Continued)

*Primary Examiner* — Talivaldis Ivars Smits
*Assistant Examiner* — Fariba Sirjani (57) ABSTRACT

Characteristic features are extracted from an audio sample based on its acoustic content. The features can be coded as fingerprints, which can be used to identify the audio from a fingerprints database. The features can also be used as parameters to separate the audio into different categories.

20 Claims, 6 Drawing Sheets

U.S. PATENT DOCUMENTS

| | | | |
|---|---|---|---|
| 2004/0172240 A1 | 9/2004 | Crockett et al. | |
| 2004/0249859 A1 | 12/2004 | Ward et al. | |
| 2005/0038819 A1 | 2/2005 | Hicken et al. | |
| 2005/0049876 A1* | 3/2005 | Agranat | 704/270 |
| 2005/0050047 A1 | 3/2005 | Laronne et al. | |
| 2005/0147057 A1* | 7/2005 | LaDue | 370/310 |
| 2006/0064299 A1* | 3/2006 | Uhle et al. | 704/212 |
| 2006/0075884 A1* | 4/2006 | Streitenberger et al. | 84/616 |
| 2006/0149533 A1* | 7/2006 | Bogdanov | 704/205 |
| 2006/0190450 A1 | 8/2006 | Holm et al. | |
| 2006/0217828 A1 | 9/2006 | Hicken | |
| 2006/0229878 A1* | 10/2006 | Scheirer | 704/273 |
| 2007/0055500 A1* | 3/2007 | Bilobrov | 704/217 |
| 2007/0112565 A1* | 5/2007 | Kim et al. | 704/229 |
| 2007/0185718 A1* | 8/2007 | Di Mambro et al. | 704/273 |
| 2008/0215315 A1* | 9/2008 | Topchy et al. | 704/205 |
| 2009/0138108 A1* | 5/2009 | Teo et al. | 700/94 |
| 2009/0150164 A1* | 6/2009 | Wei et al. | 704/500 |
| 2009/0157391 A1* | 6/2009 | Bilobrov | 704/200.1 |
| 2009/0254352 A1* | 10/2009 | Zhao | 704/500 |
| 2009/0265174 A9* | 10/2009 | Wang et al. | 704/273 |
| 2010/0094639 A1* | 4/2010 | Rhoads | 704/500 |
| 2010/0131645 A1* | 5/2010 | Marvasti | 709/224 |
| 2010/0145708 A1* | 6/2010 | Master et al. | 704/270 |
| 2010/0250585 A1* | 9/2010 | Hagg et al. | 707/769 |
| 2011/0142348 A1* | 6/2011 | Radhakrishnan et al. | 382/195 |
| 2011/0191101 A1* | 8/2011 | Uhle et al. | 704/205 |
| 2011/0196900 A1* | 8/2011 | Drobychev et al. | 707/812 |
| 2011/0299721 A1* | 12/2011 | He et al. | 382/100 |
| 2011/0314995 A1* | 12/2011 | Lyon et al. | 84/609 |

OTHER PUBLICATIONS

J. Foote, "Methods for the Automatic Analysis of Music and Audio," Technical Report FXPAL-TR-99-038, Xerox Corporation, 1999.*

* cited by examiner

Figure 3   Feature Extractor

Figure 4  Beat Analysis

Figure 5   Energy Analysis

Figure 6 Feature Analysis and Classification

FEATURE EXTRACTION FOR IDENTIFICATION AND CLASSIFICATION OF AUDIO SIGNALS

CROSS-REFERENCE TO RELATED APPLICATIONS

This application claims the benefit of U.S. Provisional Application No. 60/958,478, filed Jul. 6, 2007, which is hereby incorporated by reference in its entirety.

STATEMENT REGARDING FEDERALLY SPONSORED RESEARCH OR DEVELOPMENT

Not Applicable

BACKGROUND

1. Field of the Invention

The present invention relates to the extraction of characteristic features from audio signals and matching to a database of such features. Part or all of the extracted features can be used to separate the audio into different categories.

2. Background of the Invention

Audio has always been an important format of information exchange. With the increased adoption of faster internet, larger computer storage and web2.0 services, vast amount of audio information is present. Because of the nature and the vast amount of audio data, searching and retrieving relevant audios are very challenging tasks. One common method used to facilitate the process is by using metadata. For example, the title, genre and the singer information of a song can be coded as bits sequences and embedded in the header of the song. One common implementation of the metadata for music is the ID3 tag for MP3 songs. However, unlike the text information, different audios have different acoustic characteristics. The traditional metadata tagging for audios does not best represent the content and character of the audio information, thus alone by itself is not adequate for searching and retrieving audio information, Hence better ways to automatically identify and classify the audio information based on its content are needed. Further more, the same piece of digital audio information can be represented in different sample frequencies and coded in different compression standards. Extra distortion can be added when the audio information is transmitted through various communication channels. A good set of audio features should not only describe the unique acoustic characteristic of the audio, but also should be robust enough to overcome distortions.

Further, because of personal tastes, a piece of audio information such as music can be liked by some users and disliked by others. When personalized service is preferred, it is important to retrieve the audio information tailored to users interest. To achieve this goal, the content based audio analysis and feature extraction is needed. For example, a website selling music online would like to provide their users with personalized song recommendations. A web software function can monitor individual user's music downloading activity, analyze the music according to its acoustic content. A set of features can be extracted. A search is performed according to the features against the central database. As the result, a list of most relevant music can be presented which is tailored to the user's taste.

The process mentioned above can also be used in the area of intellectual property protection and monitoring. Currently, the popular way to protect the copyrighted audio information is to embed watermarks and metadata. But it is very intrusive and does not correlate to the content of the audio information. It is also prone to altering. In comparison, the features extracted from audio content are a more complete representation of the audio information. They can reside in the header of audio rather than be embedded in the audio stream. By working with the database, which has the collection of pre-known features, it can monitor and identify illegal distributions of copyrighted material over broadcast or P2P networks and etc.

Most content based audio feature extractions are based on the frequency domain analysis. The MFCC method, which was originally used for speech recognitions, has been used widely as an important feature for identifying audio signals. (MFCC has been explained extensively in prior arts). But the MFCC method is based on the short-term frequency analysis, the accuracy of identification is greatly decreased when noise, trans-coding and time shifting are present.

The MFCC feature is normally classified as timbrel texture features. Together with metadata, it can be used in audio classification. Other content based features which has been used in facilitating audio classification includes spectral centroid, mean and the zero crossings of the audio samples, linear prediction coefficients (LPC). Spectral centroid is the centroid of the audio signal spectrum. It measures the spectral brightness of a signal. Mean value of the audio represents the loudness of the audio. Zero crossing is the number of time the signal cross the level zero. It indicates noisiness of the signal. These traditional features described above more or less only capture partial information of audio signals. In order to accurately categorize audio content, more features need to be introduced into the classification process. The more features used, the more accurate and reliable the result will be.

Thus, there is a need for other methods and systems to improve the accuracy of the audio identification and classification. Accordingly, the current invention provides an efficient and robust solution to overcome the existing limitations. Since the human perception to audio information is closely related to the beat or the rhythm of the audio, the current invention extracts acoustic features at the beat onset.

SUMMARY OF THE INVENTION

The present invention provides a system and methods to extract the characteristic features from the acoustic content of the audio information. It uses a multi step approach to decrease the noise level in the audio signal. Then, the dominant acoustic characteristics at the beat onsets are extracted.

Firstly, the preprocessor extracts the additive noise from the signal. Afterwards, the mean subtraction is used to de-correlate the convolutional noise from the signal. Further, the beat and energy characteristic of the audio signal are analyzed in sub-band domain. A fingerprint consists of a sequence of bits is generated, which can be used to check with a fingerprint database for identification purposes. A set of inter-band features and intra-band features are also derived. The features can then be used to classify the audio information. The features are closely related to the beat of the audio and thus are good representation of the audio from human perspective. During the beat analysis, a re-sampling scheme is employed. The re-sampling process eliminates the effect of the different playback speeds, thus improves the accuracy of the derived fingerprints. The re-sampling process mostly results in down sampling, which in turn compresses the signal so that smaller fingerprints can be achieved.

A processor readable medium bearing processor executable instructions can carry out the method in current invention.

Further aspects of the invention will become apparent from consideration of the drawings and the description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

DETAILED DESCRIPTION OF ILLUSTRATIVE EMBODIMENTS

Overview

Figure 1:
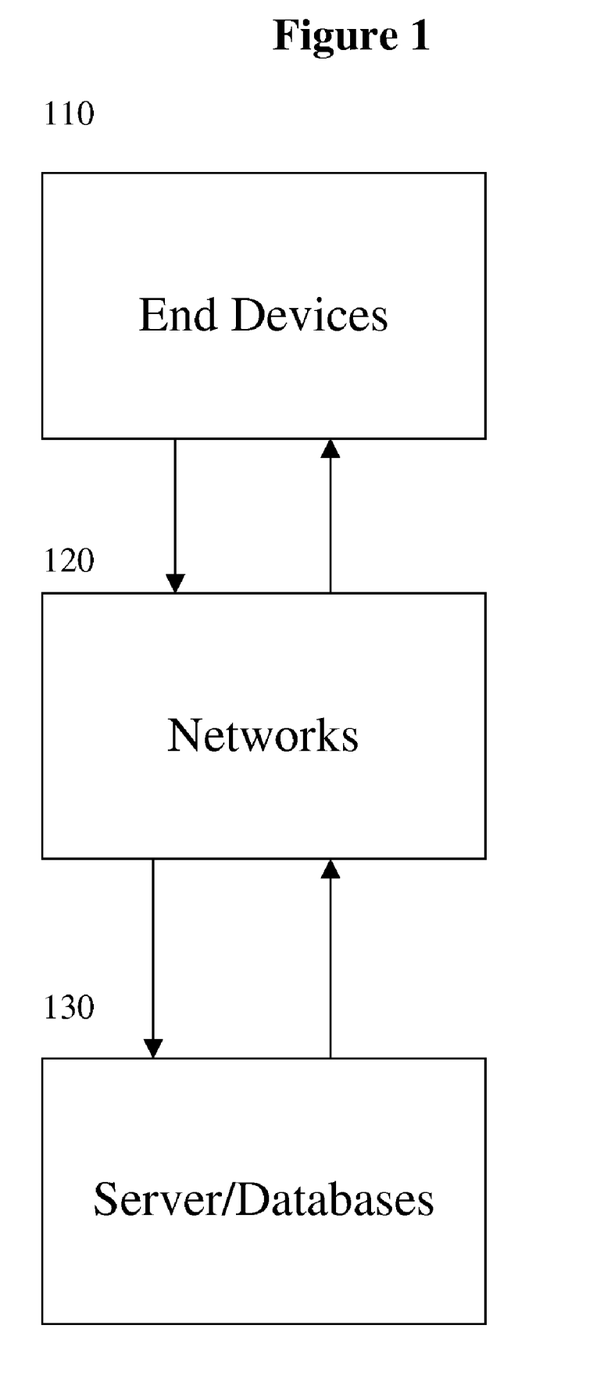
FIG. 1 is a block diagram representing an exemplary environment in which the present invention may be implemented.

Embodiments of the present invention enables efficient and robust feature extraction from audio signals, which can be used to identify and classify audio signals. FIG. 1 is an exemplary environment to illustrate the application of the present invention. End devices 110 are connected with a server or a sever databases via a network. The audio signal can reside in or be generated from the end devices, which in turn transmit the signal to the server. The server performs the feature extraction, identify the audio against the database and then returns back the identification information to the end devices. If it is required, the server can also classifies the audio and updates the entry in the database. The end devices can be a computer, a mobile phone, a TV, a DVD player or any electronic device. The network can be any inter-connection such as Internet, radio link, wired or wireless. The server can be a computer with database or without. The present invention can also apply to standalone devices and/or servers.

Figure 2:
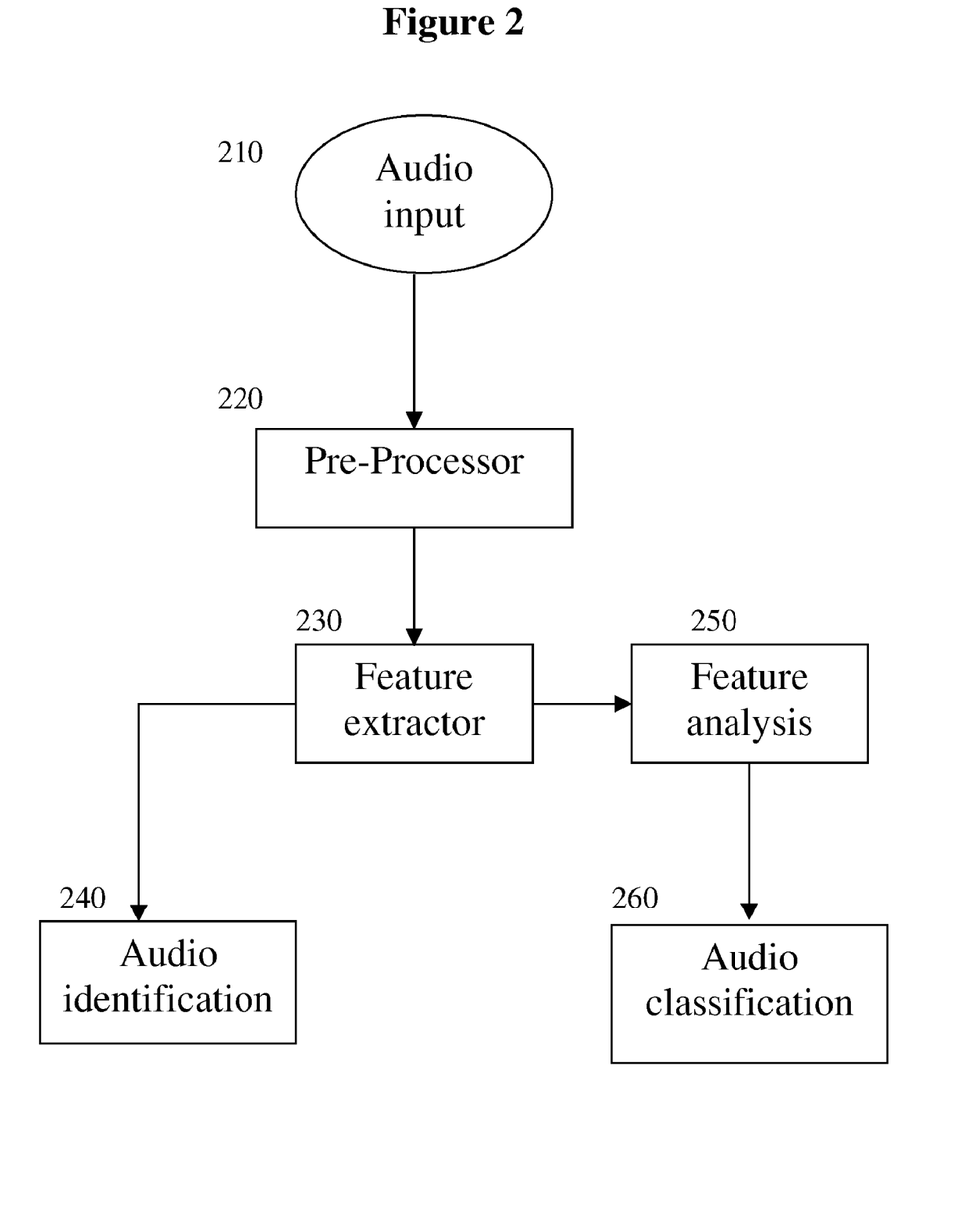
FIG. 2 illustrate an exemplary processing blocks performed to extract features from the given audio and to identify and classify the given audio, in accordance with present invention.

FIG. 2 illustrates an exemplary flow diagram according to the present invention. At first, the audio signal 210 is fed to the preprocessor 220. Certain audio signals, such as songs, have short period of silence at the start. The pre-processor detects the onset of the song and disregards the silence. In case that the noise is present in the input audio, the pre-processor also remove the white additive noise. The resulting signal has higher signal to noise ratio, which in turn increases identification accuracy. After pre-processor, the feature extractor 230 is used to extract characteristic audio features. The resulting features can be used as fingerprints to compare against known fingerprints database for audio identification. Part or all of the features can also be used for classification purpose.

Features Extraction

Figure 3:
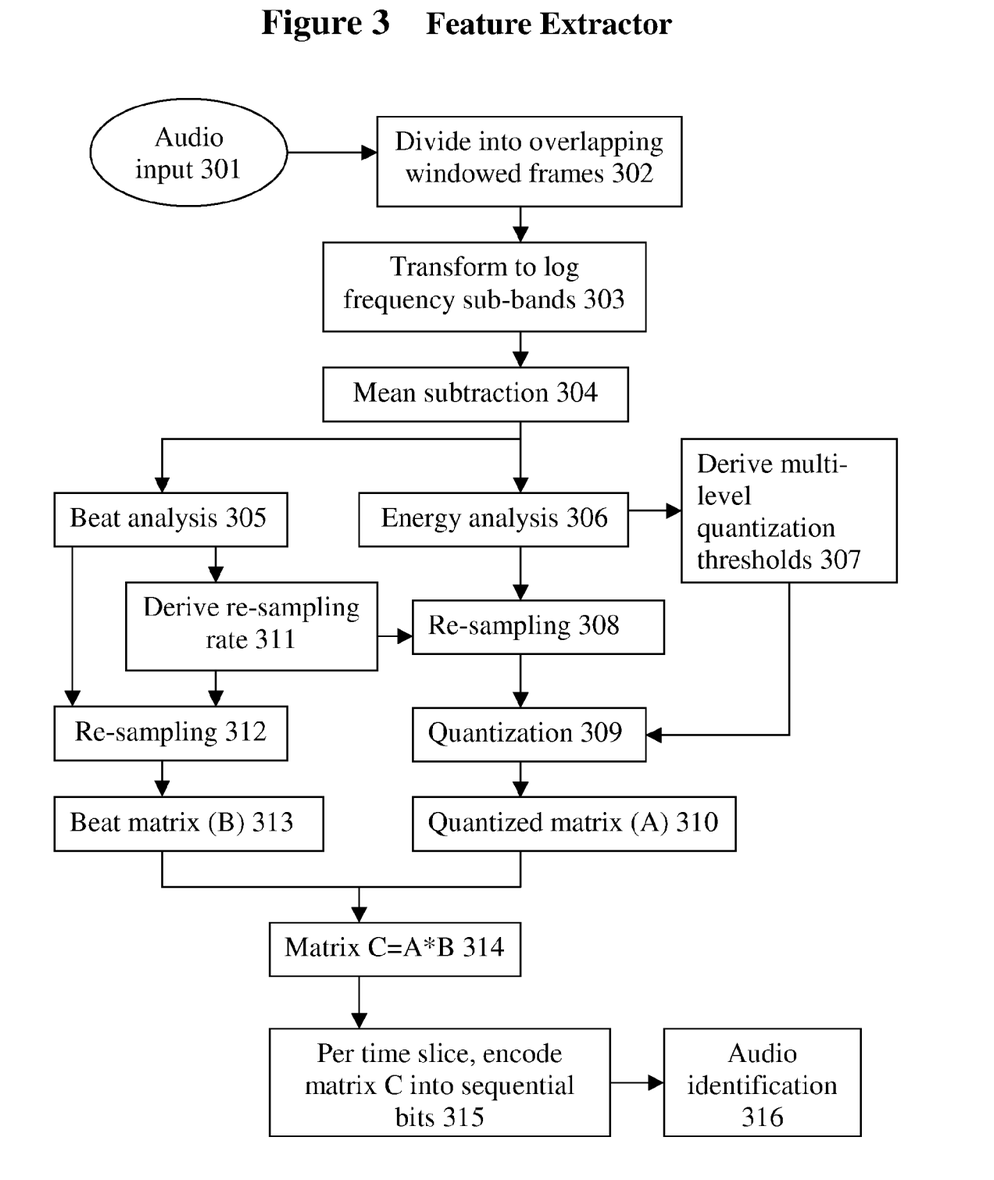
FIG. 3 is a flow diagram of detailed processing performed to extract audio features in accordance with the present invention.

One embodiment of features extraction system according to present invention is illustrated in FIG. 3. The features extraction system comprises of windowing 302, sub-band transformation 303, mean extraction 304, beat analysis 305, energy analysis 306, re-sampling 308, matrix manipulation 314 and bit encoding 315.

The detail is described as below.

Firstly, the input digital audio samples are segmented into overlapping groups in time domain to form frames. The frames are transformed into spectral sub-bands in frequency domain. The mid-frequency of the spectral sub-bands can be in linear scale or in logarithmic scale or other scales system. The subsequent sub-bands may also overlap. Since the ultra low and ultra high audio frequency is inaudible to humans ear, the sub-bands only need to cover certain frequency range, such as from 70 Hz to 4000 Hz.

There are many ways to implement the sub-bands transformation. In one embodiment, the transformation can be achieved using a short-time Fast Fourier Transform (FFT). For example, the input audio signal with sampling frequency of 44.1 kHz is segmented into overlapping frames of time duration of T1 (i.e. T1=0.37 sec). The overlapping ratio can be R (i.e. R=15/16). The frames are then multiplied with the Hamming window. The FFT is performed on the frames at every time duration of T2, where T2=T1*(1−R). In this case, T2 is 0.018 sec. The corresponding power spectrum can be obtained by taking the square of the FFT coefficients, the results can be noted as sub-bands coefficients. Then Mel scaling filter can be convolved with the FFT coefficients before deriving the sub-band coefficients. The Mel scaling filter comprises a series of triangular shaped windows with center frequency spaced logarithmically. The Mel scaling was found to match the human ear response to the audio signal. It is illustrative to use Mel scaling in this example. According to the present invention, it is also possible to use linear or other scale to derive sub-bands coefficients. By now, each sub-band coefficient represents the power spectrum value of the audio signal at the specific band and specific time slice. Further, logarithm operation is applied to the sub-bands coefficients.

In one embodiment, the filter banks can be used to transform time domain signals to the frequency domain to derive the sub-bands coefficients. Quadrature Mirror Filterbanks (QMF) are widely used filter banks for that purpose. Other time-frequency domain transform implementations are also possible, such as Modified Discrete Cosine Transform (MDCT).

After deriving the sub-bands coefficients, processing proceed to block 304. For each time slice, the mean value of all the sub-bands coefficients is calculated and extracted. Since the coefficients are in log value, to extract the mean value in frequency domain equals extracting the noise, which is convolved with the signal in time domain. This step in the present invention reduces noise and boosts the signal to noise ratio (SNR), thus provides more accurate features for audio identification and classification.

In block 305, the beat of the audio signal is analyzed. It is not the goal of the present invention to calculate the exact beat or tempo of the audio signal. Rather, it estimates the time location where the beat occurs. Then the dominant acoustic features at the beat onset time can be extracted.

Figure 4:
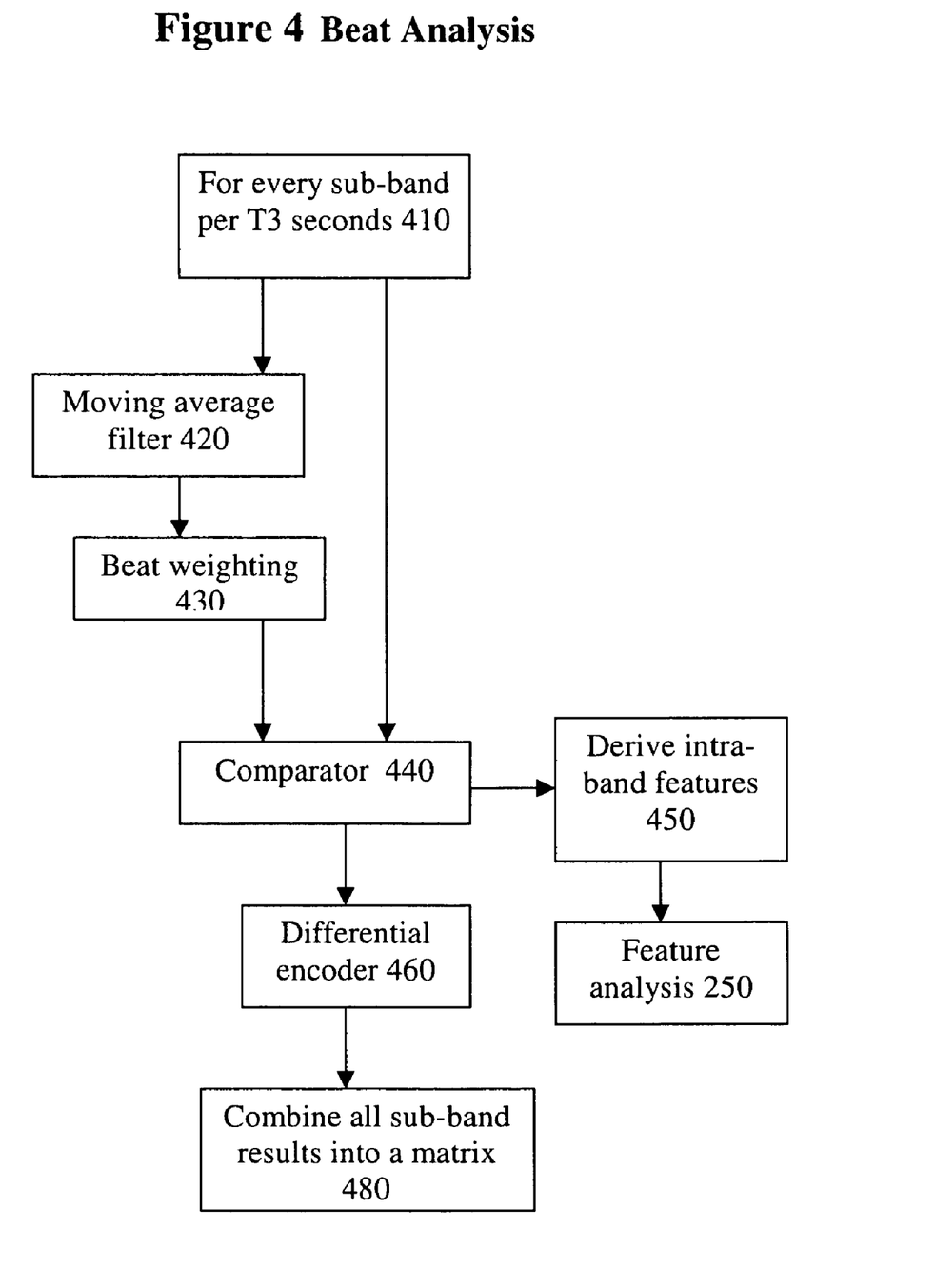
FIG. 4 is a block diagram of the processing performed for beat analysis in accordance with the present invention.

FIG. 4 presents an embodiment of the beat analysis accordance with current invention. Since the beat usually occurs with significant energy signature, one embodiment of the present invention analyzes the cumulative energy components in frequency domain for each sub band. For example, in block 420, for each sub-band, moving average filter can be used on N (i.e. N=150) timely consecutive sub-band coefficients for the duration of time T3. The impulse response of the moving average filter may be rectangular pulse or other, which expands T3 time duration. In this example, a reasonable value of T3 can be 2.7 sec (i.e. T3=N*T2=150*0.018 sec=2.7 sec) seconds. The moving average filter is used here for illustration. The advantages of moving average filter include easy implementation and fast step response. In one embodiment, a filter with a Gaussian impulse response is used. In another embodiment, filter with Blackman impulse response is used. Other types of filters with different impulse responses are also possible. Each output signal of these filters is a weighted sum of a group of the input sub-band coefficients. In case of the Gaussian or Blackman filter, the impulse response tapers. The input sub-band coefficients that are farther away are given less weight than those close by. In another embodiment, first order Auto Regressive (AR) model is adopted, in this case the desired output can be recursively obtained by using the equation:

filter-output($t$+1)=alpha*filter-output($t$)+(1−alpha)
*sub_bands_coefficients($t$); where alpha can take the value of 0.95.

For each sub-band, the output of the filter is further multiplied with a weighting coefficient as in the beat weighting block 430. In one embodiment where the moving average filter is used, the weighing coefficient for the output of the filter can take value of 1.25. From there, the process proceeds to the comparator block 440 where the current sub-band coefficient is compared to the output of the filter. The output of the filter may result from a group of input sub-band coefficients, which may or may not include the current sub-band coefficient in the comparator block 440. The differential encoder 460 is used to encode the difference between the current sub-band coefficient and the filter output. If the current sub-band coefficient is greater or equal to the filter output, the result from the differential encoder is 1, otherwise, the result is 0. The presence of bit 1 indicates a possible beat occurrence in that sub-band. These bit sequence can be stored in a vector. Or, a segment of these bit sequences, which are sequential in time can be stored in a matrix B as block 313 and block 480.

The intra-band features 450 can be derived from the beat analysis block. In one embodiment, after the comparison block 440, the zero crossing rate of each sub-band is calculated for every T3 time duration. This rate correlates to the beat rate of the audio signal for each sub-band. The higher the rate is, the faster the beat. Further, each sub-band beat rate can be weighed and added together to derive the beat feature for the T3 time period. In another embodiment, after the comparison block, the linear predicative coding (LPC) can be used to estimate the prediction coefficients of the dominant sub-bands. The coefficients can be used later for audio classification purpose. Yet in another embodiment, rather than use LPC, the statistical features can be calculated for each sub-band after the comparison block, such as the mean, variance, second or third order moments. All these features have in common is that they represent characteristics within each sub-band. These features are extracted after the comparison block, they correlate more with the fluctuation of the beat signature in the specific sub-band. Together with traditional statistic features such as the mean and variance of the audio samples, these new features derived from the present invention provide a more accurate way for audio classification.

In the beat analysis block, a re-sampling rate can be calculated. In one embodiment of present invention, the output from the beat analysis is down sampled by eliminate one element per every N1 elements. In case that N1 is 2, the down sampling further compresses the size of the fingerprints in half.

In parallel to the beat analysis, the total energy analysis is performed on the sub-band coefficients with time duration of T4. T4 can be as same as the T3 in beat analysis or take other values (i. e. T3=4 seconds). One embodiment of the total energy analysis of present invention is illustrated as FIG. 5. All the sub-bands coefficients, which correspond to the same time slice, are added together to generate the total energy for that specific time slice. The said total energy results for a segment of sequential time slices are stored in a vector V. As in block 520, a filter such as a moving average filter is used to weigh and sum together the elements in the vector V. The filter output can be noted as Y. Rather than using moving average filter, other filters can also be used for implementing the process to weight and sum together the elements in the vector V. Example of such filters including Gaussian filter or Blackman filter. Afterwards, a set of weighting coefficients, noted as W, is applied to the output of the filter to generate at least one quantization threshold. The set of weighting coefficients can be a single value, such as 1.25, or as a vector, such as [1.1, 0.8].

Figure 5:
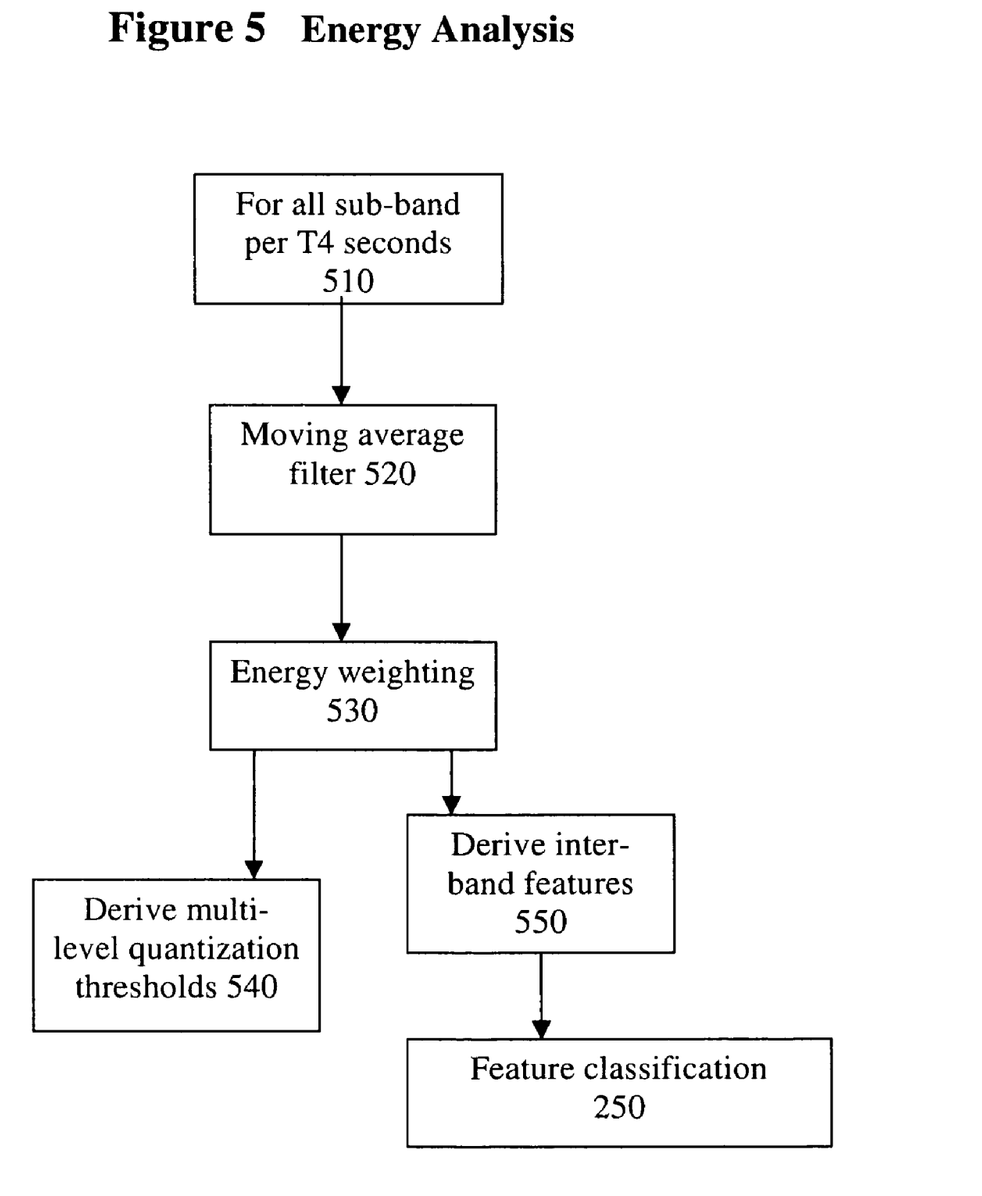
FIG. 5 is a block diagram of the processing performed for energy analysis in accordance with the present invention.

Similar to the re-sampling scheme used after the beat analysis, the re-sampling scheme used after the total energy analysis uses the same re-sampling rate. For example, in one embodiment, the down sampling rate N is 2 and the set of weighting coefficients W has single value of 1.25. The weighted output vector from the total energy analysis is O=1.25*V. For all the elements of vector O, every other element is eliminated.

From there, process goes on to block 309. All the sub-bands coefficients, which correspond to the same time slice are quantized by the element in O. The sub-band coefficients being quantized have the same time slice index with the quantizer element in O. In one embodiment, the resulting values from the quantizer are set to 1 when the sub-bands coefficients are larger than the quantization value in O, otherwise, it is set to 0. These bit sequence can be stored in a vector, or, a segment of these bit sequences, which are sequential in time can be stored in a matrix A as the block 310. The values in A indicate which sub-bands are dominant at a given time slice.

A set of inter-band features can be generated from the energy analysis block and the matrix A. Similar to the method used to derive the intra-band features after the beat analysis block, the zero crossing rate (ZCR), linear prediction coefficients (LPC), statistical mean, variance and higher order momentum can be applied to the matrix A to derive the inter-band features. The inter-band features reflect the changes between different frequency bands. By collaborating with the intra-band features, inter-band features can correlate to the spectrum change particularly at the beat occurrence.

After deriving matrix A and matrix B, process goes on to block 314. The matrix A is multiplied with matrix B to generate the matrix C. The nonzero values in C correlate to the dominant sub-bands at the time slice where beat occurs. If each row of the matrix C corresponds to frequency sub-bands and each column corresponds to time slices (i.e. if C is 16 rows by 288 columns, C has 16 sub-bands and 288 time slices). Each columns of matrix C can be further encoded into bit sequences, which can be used as the fingerprints (i.e. the fingerprints has 288 bit sequences with each bit sequence consists of 16 bits).

Audio Identification

After the fingerprints are extracted from the content of audio, it can be compared against a reference fingerprints database of known audio signals. In one embodiment of the present invention, the extracted fingerprint is compared against the database to see how many bits are different and the bit error rate (BER) is calculated. If the BER is less than a certain threshold, a positive detection is found, otherwise, no match is found in the database. Normally, if two pieces of audio are not related, the BER will be roughly 0.5 where half of the bits are the same and half of the bits are not. The threshold for the BER based decision can be a predefined value or generated by training the algorithm with a set of training data. An embodiment of the present invention has been tested against audio signals with added white noise at 30 dB signal to noise ratio (SNR) and 1% variation in frequency (giving preserved tempo), it has delivered reliable identification results.

Feature Analysis and Audio Classification

Figure 6:
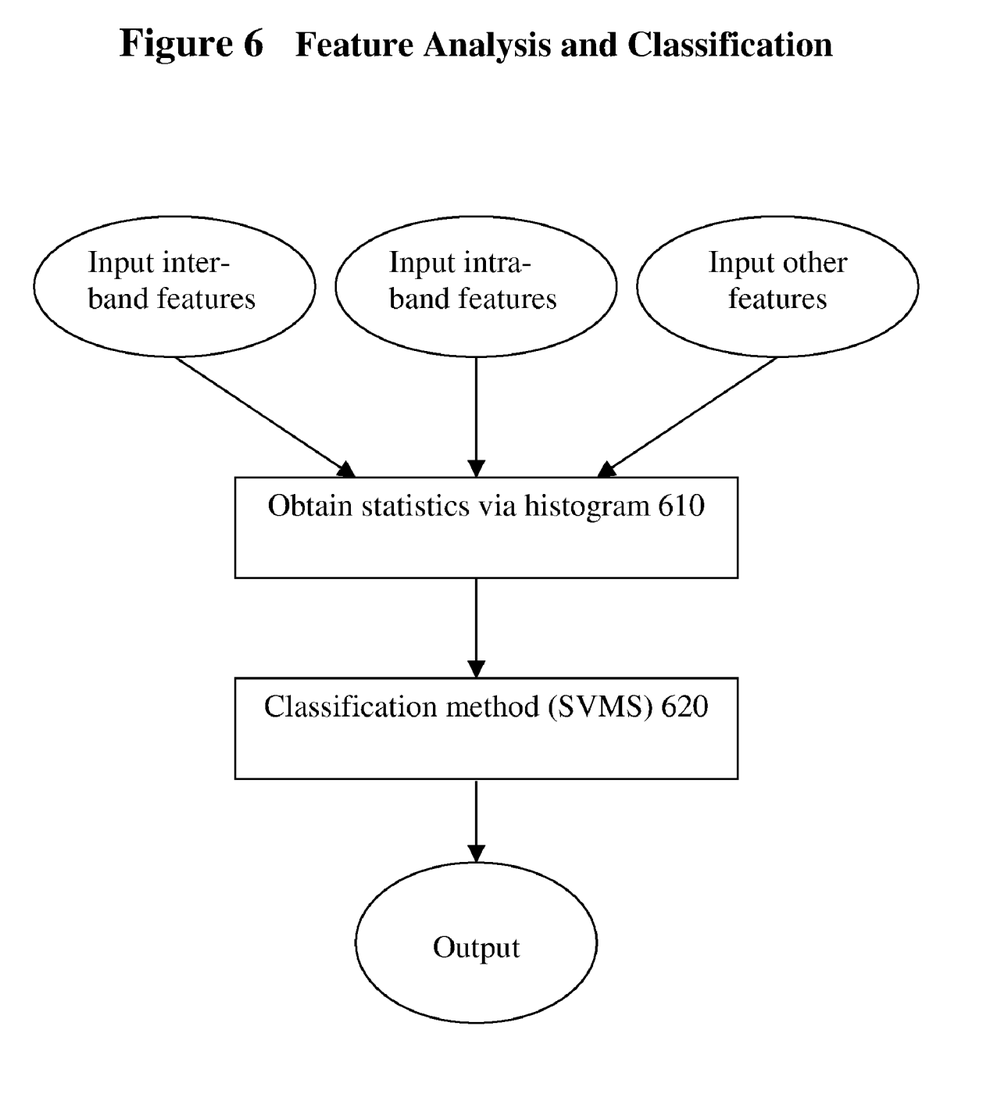
FIG. 6 is a block diagram of the processing performed for feature analysis and classification in accordance with the present invention.

One embodiment of the present invention uses the inter-band features, intra-band features together with other traditional features to facilitate the classification task. Traditional features include mean, variance and derivative of the audio samples, zero crossing of the audio samples, power spectrum distribution, spectral centroid and spectral rolloff. All the features can be grouped in a dataset, then, the support vector machines (SVMs) can be used as a multi-class classification method to categorize the audio signal into acoustically similar groups. FIG. 6 illustrate one embodiment of the present invention for the purpose of audio classification.

The foregoing description of the embodiments of the invention had been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A method for extracting audio features from a plurality of audio frames to classify said plurality of audio frames into acoustically similar groups, the method comprising:
    transforming each audio frame of said plurality of audio frames into a plurality of frequency sub-bands to obtain a transformation result;
    Storing the transformation results for the plurality of audio frames as sub-band coefficients in S, wherein each sub-band coefficient correlates to an audio frame at a time slice with a frequency sub-band;
    for each time slice of S, subtracting each of the sub-band coefficient within the same time slice from a mean value corresponding to the same time slice to obtain a set of new sub-band coefficient;
    storing the sets of new sub-band coefficients for all the time slices in Z;
    calculating a beat matrix from Z and storing the beat matrix in B, wherein a first axis of B corresponding to a time slice and a second axis of B corresponding to a frequency sub-band, and wherein each nonzero entry in B corresponds to a beat onset of the audio frames at each frequency sub-band;
    calculating a plurality of quantized coefficients from Z according to at least one quantization threshold and storing the quantized coefficients in A;
    calculating a plurality of intra-band features from B, wherein the intra-band features correlate to beat signatures of the audio frames at a frequency sub-band; and
    calculating a plurality of inter-band features from A, wherein the inter-band features correlate to changes among the frequency sub-bands of the audio frames.

2. The method of claim 1, wherein calculating a plurality of inter-band features from A comprises:
    calculating a plurality of zero crossing rates, linear prediction coefficients, means, variances, derivatives and second order moments of A; and
    grouping the above said calculating results into a plurality of inter-band features.

3. The method of claim 1, wherein calculating a plurality of intra-band features from B comprises:
    calculating a plurality of zero crossing rates, linear prediction coefficients, means, variances, derivatives and second order moments of B; and
    grouping the above said calculating results into a plurality of intra-band features.

4. The method of claim 1, wherein the sub-band coefficients in S are in logarithmic scale.

5. The method of claim 1, wherein transforming each audio frame of said plurality of audio frames into a plurality of frequency sub-bands comprises performing a short-time Fast Fourier Transform.

6. The method of claim 1, wherein transforming each audio frame of said plurality of audio frames into a plurality of frequency sub-bands comprises applying filter banks to the audio frame.

7. The method of claim 1, wherein Z is a matrix with a first axis corresponding to a time slice and a second axis corresponding to a frequency sub-band, and wherein calculating a beat matrix from Z comprises differential encoding each coefficient in Z against a beat threshold, wherein the beat threshold is derived from a plurality of sequential coefficients within a same frequency sub-band of Z, and wherein the said deriving comprises:
    filtering the plurality of sequential coefficients to generate a filter output, wherein the filter impulse response tapers; and
    assigning a beat weight to the filter output to derive the threshold.

8. The method of claim 1, wherein Z is a matrix with a first axis corresponding to a time slice and a second axis corresponding to a frequency sub-band, and wherein the at least one quantization threshold is derived from a plurality of coefficients of Z within a same time slice, and wherein the said deriving comprises:
    for each time slice in Z, calculating a sum of all the sub-band coefficients within the same time slice to obtain a plurality of total band energy and storing the plurality of total band energy in vector V;
    filtering a plurality of sequential elements of V to generate a filtered output, wherein the filter impulse response tapers; and
    applying a set of weighting coefficients to the filtered output to derive the at least one quantization threshold.

9. The method of claim 1, further comprising grouping the inter-band features and the intra-band features into a dataset in sequential order and applying a Support Vector Machines (SVMs) to the dataset to classify the audio frames into acoustically similar groups.

10. A method for extracting an audio fingerprint from a plurality of audio frames, the method comprising:
    transforming each audio frame of said plurality of audio frames into a plurality of frequency sub-bands to obtain a transformation result;
    storing the transformation results for the plurality of audio frames as sub-band coefficients in S, wherein each sub-band coefficient correlates to an audio frame at a time slice with a frequency sub-band;

for each time slice of S, subtracting a mean of elements of the time slice from each sub-band coefficient within the time slice to obtain a set of new sub-band coefficients for the time slice;

storing sets of new sub-band coefficients for all the time slices in Z;

calculating a beat matrix from Z and storing the beat matrix in B, wherein each nonzero entry in B corresponds to a beat onset of the audio frames at each frequency sub-band;

calculating a plurality of quantized coefficients from Z according to at least one quantization threshold and storing the quantized coefficients in A;

calculating the audio fingerprint from A and B, wherein A and B are matrices with a first axis corresponding to a time slice and a second axis corresponding to a frequency sub-band, wherein A and B have the same number of rows and columns, and the calculating comprises:

multiplying each element in A with a corresponding element in B to generate a matrix C; and concatenating all elements in C into a sequence of bits to generate the fingerprint.

11. A method for identifying a plurality of unknown audio frames by employing audio fingerprints of the audio frames, the method comprising:

calculating a set of audio fingerprints for the said audio frames according to the method in claim 10;

obtaining a set of same length audio fingerprints from an audio fingerprints database, wherein the fingerprints in the said database are calculated according to the method of claim 10; and comparing the said two sets of fingerprints to determine the similarity.

12. The method of claim 10, wherein transforming each audio frame of said plurality of audio frames into a plurality of frequency sub-bands comprises performing a short-time Fast Fourier Transform.

13. The method of claim 10, wherein transforming each audio frame of said plurality of audio frames into a plurality of frequency sub-bands comprises applying filter banks to the audio frame.

14. The method of claim 10, wherein Z is a matrix with a first axis corresponding to a time slice and a second axis corresponding to a frequency sub-band, and wherein calculating a beat matrix from Z comprises differential encoding each coefficient in Z against a beat threshold, wherein the beat threshold is derived from a plurality of sequential coefficients within a same frequency sub-band of Z, and wherein the said deriving comprises:

filtering the plurality of sequential coefficients to generate a filter output, wherein the filter impulse response tapers; and assigning a beat weight to the filter output to derive the threshold.

15. The method of claim 10, wherein Z is a matrix with a first axis corresponding to a time slice and a second axis corresponding to a frequency sub-band, wherein the at least one quantization threshold is derived from a plurality of coefficients of Z within a same time slice, and wherein the said deriving comprises:

for each time slice in Z, calculating a sum of all the sub-band coefficients within the same time slice to obtain a plurality of total band energy and storing the plurality of total band energy in vector V;

filtering a plurality of sequential elements of V to generate a filtered output, wherein the filter impulse response tapers; and applying a set of weighting coefficients to the filtered output to derive the at least one quantization threshold.

16. The method as in claim 11, wherein said comparing is based on bit error rate (BER), wherein the positive identification is found when the BER is less than a threshold.

17. The method as in claim 11, wherein said comparing is based on Hamming distance, wherein the positive identification is found when the Hamming distance is less than a threshold.

18. A system for extracting audio features from a plurality of audio frames, the system comprising:

one or more storage units to store the audio features; and one or more processors with non-transitory processor readable medium bearing processor executable program instructions, wherein the one or more processors are communicatively connected to the one or more storage units, and wherein the processor is operable to carry out the executable program instructions to perform the method comprising:

transforming each audio frame of said plurality of audio frames into a plurality of frequency sub-bands to obtain a transformation result;

Storing the transformation results for the plurality of audio frames as sub-band coefficients in S, wherein each sub-band coefficient correlates to an audio frame at a time slice with a frequency sub-band;

for each time slice of S, subtracting each of the sub-band coefficient within the same time slice from a mean value corresponding to the same time slice to obtain a set of new sub-band coefficient;

storing the sets of new sub-band coefficients for all the time slices in Z;

calculating a plurality of beat coefficients from Z and storing the beat coefficients in B, wherein each nonzero coefficient in B corresponds to a beat onset of the audio frames at each frequency sub-band;

calculating a plurality of quantized coefficients from Z according to at least one quantization threshold and storing the quantized coefficients in A;

calculating a plurality of inter-band features from B, wherein the inter-band features correlate to beat signatures of the audio frames at a frequency sub-band;

calculating a plurality of intra-band features from A, wherein the intra-band features correlate to changes among the frequency sub-bands of the audio frames;

multiplying each element in A with a corresponding element in B to generate a sequence of bits as an audio fingerprint for the plurality of audio frames;

storing the audio fingerprint for the plurality of audio frames into the one or more storage units; and applying Support Vector Machines (SVMs) to the plurality of intra-band features and the plurality of inter-band features to classify the audio frames into acoustically similar groups and storing the output of the SVMs to the one or more storage units.

19. The system of claim 18, wherein the one or more storage units are to store a plurality of reference fingerprint of a plurality of reference audio frames, and wherein the processor is to identify the unidentified audio frames based on a comparison of the candidate fingerprints to the reference fingerprints.

20. The system of claim 18, wherein transforming each audio frame of said plurality of audio frames into a plurality of frequency sub-bands comprises performing a short-time Fast Fourier Transform.

* * * * *